(12) United States Patent
Guigues et al.

(10) Patent No.: US 10,579,545 B2
(45) Date of Patent: Mar. 3, 2020

(54) METHOD FOR ACCESSING A PERIPHERAL DEVICE BY A HOST DEVICE VIA AN ACCESS DEVICE

(71) Applicant: ORANGE, Paris (FR)

(72) Inventors: Pierre Guigues, Lannion (FR); Marc Giovanni, Pleumeur Bodou (FR); Julien Rouland, Saint Martin d'heres (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/764,120

(22) PCT Filed: Sep. 26, 2016

(86) PCT No.: PCT/FR2016/052440
§ 371 (c)(1),
(2) Date: Mar. 28, 2018

(87) PCT Pub. No.: WO2017/077201
PCT Pub. Date: May 11, 2017

(65) Prior Publication Data
US 2018/0293182 A1    Oct. 11, 2018

(30) Foreign Application Priority Data
Sep. 29, 2015  (FR) ..................... 15 59174

(51) Int. Cl.
*G06F 13/22*  (2006.01)
*G06F 13/38*  (2006.01)
(Continued)

(52) U.S. Cl.
CPC ........ *G06F 13/102* (2013.01); *G06F 9/45558* (2013.01); *G06F 13/4282* (2013.01); *G06F 2009/45579* (2013.01)

(58) Field of Classification Search
CPC .......... G06F 13/22; G06F 13/38; G06F 13/40
See application file for complete search history.

(56) References Cited

U.S. PATENT DOCUMENTS

| 2004/0090984 A1 | 5/2004 | Saint-Hilaire et al. |
| 2008/0140811 A1* | 6/2008 | Welch ................. H04L 12/4625 709/219 |

(Continued)

FOREIGN PATENT DOCUMENTS

WO    2005033847 A2    4/2005

OTHER PUBLICATIONS

International Search Report and Written Opinion dated Dec. 13, 2016 for International Application No. PCT/FR2016/052440, filed Sep. 26, 2016.

(Continued)

*Primary Examiner* — David E Martinez
(74) *Attorney, Agent, or Firm* — David D. Brush; Westman, Champlin & Koehler, P.A.

(57) ABSTRACT

A method for accessing a peripheral device via a wide area communication network. A control device receives a data item indicating that the peripheral device is connected via a series interface to an access device having access to the wide area communication network. The control device sends to the home device a command for its association with the peripheral device using an address associated with the access device. The home device then sends a command for the transfer of the peripheral device resources to the access device. This association enables the home device to access the peripheral device remotely in order to use the latter via a driver for the peripheral device installed on the home device.

10 Claims, 2 Drawing Sheets

(51) Int. Cl.
　　　*G06F 13/40*　　　(2006.01)
　　　*G06F 13/10*　　　(2006.01)
　　　*G06F 9/455*　　　(2018.01)
　　　*G06F 13/42*　　　(2006.01)

(56) References Cited

U.S. PATENT DOCUMENTS

| | | | |
|---|---|---|---|
| 2009/0024746 A1* | 1/2009 | Welch | H04L 12/4625 |
| | | | 709/228 |
| 2009/0132737 A1* | 5/2009 | Huang | H04L 12/2818 |
| | | | 710/62 |
| 2012/0200878 A1 | 8/2012 | Sasaki | |
| 2017/0171896 A1* | 6/2017 | Kreiner | H04W 72/048 |

OTHER PUBLICATIONS

English translation of the International Written Opinion dated Dec. 13, 2016 for International Application No. PCT/FR2016/052440, filed Sep. 26, 2016.

\* cited by examiner

METHOD FOR ACCESSING A PERIPHERAL DEVICE BY A HOST DEVICE VIA AN ACCESS DEVICE

CROSS-REFERENCE TO RELATED APPLICATIONS

This Application is a Section 371 National Stage Application of International Application No. PCT/FR2016/052440, filed Sep. 26, 2016, the content of which is incorporated herein by reference in its entirety, and published as WO 2017/077201 on May 11, 2017, not in English.

FIELD OF THE DISCLOSURE

The invention relates to the general field of telecommunications.

More particularly, the invention concerns a technique for accessing a peripheral device via a wide area network. More specifically, this peripheral device is connected to an access device, the latter having access to the wide area network (WAN), such as the Internet network.

BACKGROUND OF THE DISCLOSURE

When a new peripheral device is connected to another device via a universal serial bus (USB), this other device must have a device driver to operate this peripheral device. A device driver is a program enabling an operating system to recognize hardware and use it. It is considered hereinafter that this other device is suitable for accessing a wide area network, such as the Internet network. Hereinafter it is referred to as "access device". The access device, when it does not have the device driver for the peripheral device, then tries to obtain this device driver in order to install it to operate the peripheral device.

In a local area network, such an access device is for example an access gateway, and notably enables devices located in a client site to access the wide area network. The client site is for example a company or a living environment. For a local area network, this is notably the access gateway, a set-top box TV decoder, or a mobile terminal. In the context of a home automation network, this also includes household appliances, alarm systems and sensors.

In this home automation network context, the current trend is to provide a living area that is increasingly comfortable and safe. This requires many sensors based on various technologies or protocols to be hosted in the local area network. Indeed, several technologies and protocols are capable of coexisting in the same household environment. Generally, a home automation box manages connections with the various sensors and/or devices. This home automation box can also be integrated in the network access gateway. It is understood that in this very progressive environment, it is difficult to provide a home automation box suitable for all the configurations that it is likely to have to provide. By way of illustrative example, when the user wishes to add a sensor based on a radio technology that is not offered by the home automation box, a first solution involves changing the home automation box or the access gateway. This is very restrictive and costly for the user and also for the provider of the home automation box. A second solution involves connecting a peripheral device compatible with this radio technology to an access device via a serial interface. This access device can be the access gateway or the home automation box, or any other device located in the client site.

This leads to the access device becoming responsible for managing the interface driver suitable for the connected peripheral device.

SUMMARY

One of the aims of the invention is to remedy deficiencies/drawbacks of the prior art and/or to bring about improvements thereto.

According to a first aspect, a subject of the invention is a method of access via a wide area network to a peripheral device. This method comprises:

the reception, by a control device, of data indicating that the peripheral device is connected via a serial interface to an access device having access to the wide area network;

the sending, by the control device to a host device, of a command to associate with said peripheral device by means of an address associated with the access device, said association enabling remote access by said host device via the access device to operate the peripheral device by means of a driver for the peripheral device installed on the host device.

More specifically, the execution of the association command triggers the sending, by the host device to the access device, of a command to outsource resources of the peripheral device.

Correspondingly, at an access device, the access method comprises:

the sending, by an access device having access to the wide area network to a control device, of data indicating that the peripheral device is connected via a serial interface to said access device;

the reception, by the access device, of a command, from a host device, to outsource resources of the peripheral device;

the association of the host device with the peripheral device via the access device, said association enabling remote access by said host device via the access device to operate the peripheral device by means of a driver for the peripheral device installed on said host device.

"Access device" refers to a device having capacities to connect to the wide area network, directly or via another device. An address in the wide area network is used to reach it and enables it to communicate.

Thus, by virtue of the access method, it is possible to convey through the communication network the management of the device drivers for peripheral devices. A host device can thus provide for hosting a set of peripheral devices having identical device drivers. A host device is for example a server accessible via the wide area network. Updating of the device driver is hence performed easily and in a centralized manner in the network. The access device is relieved of management actions for this peripheral device which is connected to it. It only plays a role of intermediary in the transmission of data exchanged between the peripheral device and the host device. This also provides for conveying the service logic through the network and for relieving the access device of it. It is thus possible to host any type of peripheral device, without this hosting being provided beforehand on the access device.

The peripheral device is connected to the access device via a serial interface, for example of type USB (Universal Serial Bus). Such a peripheral device is generally not accessible directly. It is thus contacted at an address associated with the access device and on a USB port number which is associated with it.

At the access device, a software module is provided, called "generic agent", which can thus take charge of any peripheral device which is connected to the access device. This generic agent operates in the control plane by interacting with a control device and also in the data transport plane to transmit data to a host device, in order to connect a peripheral device to a service offered in the network.

In the data transport plane, the method relies on an encapsulation in IP frames of frames received via a serial interface, for example USB.

By way of illustrative example, a home automation application can thus be implemented in the network, with sensors or devices of the home automation network transmitting data to it over a virtual link set up by the access device and the host device.

More generally, in this environment, it is possible to transfer into the network data processing operations to provide a service. Such a service is for example an electricity consumption monitoring service. This transfer provides for limiting the updates needed by access devices (or access gateways) to host new sensors and offer new services. In the control plane, a service logic is executed to place an access device in relationship with a host device in the data transport plane in order to provide for exploiting data from sensors through a peripheral device.

The various embodiments or features of implementation mentioned hereafter can be added independently or in combination with one another to the steps of the access method as defined above.

In a particular embodiment, the access method additionally comprises the selection of said host device by the control device according to a product identifier of the peripheral device.

It is thus possible to make host devices more specialized according to the peripheral device product identifiers. This is particularly beneficial when the host device is administered by the provider of this peripheral device to provide a specific service.

In a particular embodiment, the access method additionally comprises the creation of a virtual machine forming a new host device, when no host device has capacities required to host the peripheral device.

The control device has an overview of the various host devices and can thus manage the resources available on the host devices.

In a particular embodiment, the access method additionally comprises the creation of a virtual machine forming a new host device, when the hosting capacities available for peripheral devices having identical product identifiers are lower than a threshold.

In this particular embodiment, a host device is a virtual machine relying on at least one physical machine. The control device is notably arranged to create/remove virtual machines, for example according to connection requests transmitted by all the access device generic agents. A virtual machine reproduces the behaviors and features of a physical machine. Thus, in a manner comparable to a physical machine, a virtual machine is characterized by the number of processors, the quantity of memory, the storage units and the network interfaces which it has at its disposal. Additionally, it operates in an identical way to any real machine.

According to information, indicating a connection of a peripheral device to a serial interface of an access device and sent by the generic agent to the control device, the latter can adapt the resources to enable direct operation of the peripheral device by a host device. This dynamic activation of resources takes place according to certain technical criteria such as the product identifiers but also according to the availability of resources. Thus, if there is an insufficient number of certain resources for a type of peripheral device, with respect to a growing stock, the control device will be able to create new resources. However, if peripheral devices of the same type are taken out of service, the control device can reassign the unused resources.

It is thus possible to dynamically adapt the host system, formed by the control device and one or more host devices, in order that it can take charge of new peripheral devices according to demand. The host system also adapts to connection requests from new products, by creating upon demand host devices suitable for hosting them.

In a particular embodiment, the access method comprises the sending, to the access device, of at least one identifier of a product unable to be hosted.

The access device thus knows the types of device that can be hosted in the network and does not query the control device otherwise. This type of device can therefore only be managed locally.

According to a second aspect, the invention also concerns a control device for access via a wide area network to a peripheral device. This control device comprises:
  a module for receiving data indicating that the peripheral device is connected via a serial interface to an access device having access to the wide area network;
  an association command module, arranged to send to a host device a command to associate with said peripheral device by means of an address associated with the access device, the execution of the association command triggering the sending, by the host device to the access device, of a command to outsource resources of the peripheral device and said association enabling remote access by said host device via the access device to operate the peripheral device by means of a driver for the peripheral device installed on said host device.

The advantages stated for the access method according to the first aspect can be transposed directly to the control device.

In a particular embodiment, the control device additionally comprises a module for managing virtualized resources, which is arranged to create or remove at least one virtual machine forming a host device.

The advantages stated for the access method according to the first aspect during its implementation in a virtualized environment can be transposed directly to the control device.

According to a third aspect, the invention also concerns a host device. This host device comprises:
  an operating module, arranged to remotely operate a peripheral device by means of a driver for the peripheral device installed on said host device;
  an association module, arranged to receive a command to associate with a peripheral device by means of the address of an access device and, during the execution of the association command, to send to the access device a command (N3) to outsource resources of the peripheral device.

The advantages stated for the access method according to the first aspect can be transposed directly to the host device.

According to a fourth aspect, the invention also concerns a host system for access via a wide area network to a peripheral device, said system comprising at least one control device according to the second aspect and at least one host device according to the third aspect.

The advantages stated for the access method according to the first aspect can be transposed directly to the host system.

According to a fifth aspect, the invention also concerns an access device for accessing a wide area network, comprising:
- at least one connector, arranged to receive at least one peripheral device via a serial interface;
- a software module, arranged to send to a control device data indicating that the peripheral device is connected by means of the connector, to receive from a host device a command to outsource resources of the peripheral device to associate said host device with said peripheral device, said association enabling remote access by the host device to operate the peripheral device by means of a driver for the peripheral device installed on said host device.

The advantages stated for the access method according to the first aspect can be transposed directly to the access device.

According to a sixth aspect, the invention concerns a program for a device, comprising program code instructions intended to control the execution of those of the steps of the previously described access method which are implemented by the device, when this program is executed by this device, and a recording medium that can be read by a device on which a program for a device is recorded.

The device is a control device, an access device or a host device.

The advantages stated for the access method according to the first aspect can be transposed directly to the program for a device and to the recording medium.

BRIEF DESCRIPTION OF THE DRAWINGS

The technique for accessing a peripheral device will be better understood with the aid of the following description of particular embodiments, with reference to the accompanying drawings in which.

DETAILED DESCRIPTION OF ILLUSTRATIVE EMBODIMENTS

Figure 1:
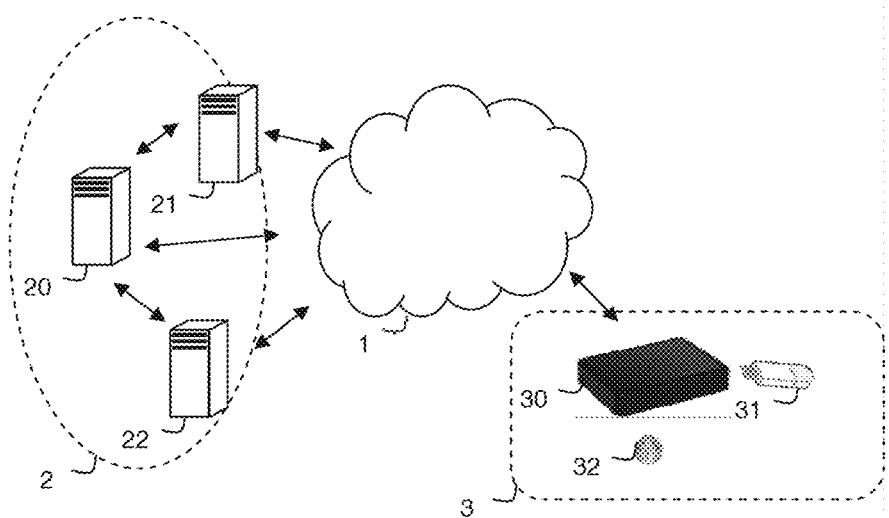
FIG. 1 represents a system for hosting peripheral devices in its environment in a particular embodiment.

FIG. 1 represents, in its environment, a system 2 for hosting peripheral devices, comprising a control device 20 and two host devices 21, 22. These various devices can be accessed via a wide area network 1, or WAN (Wide Area Network), such as the Internet network (also called IP network, for "Internet Protocol"). The control device 20 is arranged to communicate in the control plane with an access device 30 and the host devices 21, 22. There is no limitation associated with the number of control devices and host devices.

An access device 30 has access to the wide area network. An address in the IP network is associated with it and enables it to be reached by other devices connected to the wide area network and to communicate to such other devices. An address of this type is known under a public address naming scheme.

The access device 30 notably comprises a USB (Universal Serial Bus) type serial connector. There is no limitation associated with this type of wired connector. In this particular embodiment, the access device 30 comprises an encapsulation and extraction module, arranged to encapsulate USB input messages in IP frame payloads and to extract USB output messages from IP frames. This software encapsulation and extraction module is also referred to hereinafter as "generic agent". This software module is defined in the framework of the USB/IP open source project, the objective of which is to develop a USB device sharing system over an IP network.

A peripheral device 31 is connected to the access device 30 by means of the USB connector, i.e. by means of a serial link or interface. Such a peripheral device is for example a joystick, a storage peripheral (also called USB stick), a dongle for connecting to a wireless network (Wi-Fi, Bluetooth, 3G, infrared, etc), a dongle for obtaining data from a home automation sensor or to receive digital television, etc.

The host devices 21, 22 also comprise an encapsulation and extraction module, arranged to encapsulate USB input messages in IP frame payloads and extract USB output messages from IP frame payloads. The host devices 21, 22 can then exchange data remotely in the data transport plane with USB peripheral devices. The host devices 21, 22 are also arranged to execute a driver software module (or "driver") intended to enable an operating system to recognize an item of hardware and use it. By virtue of this device driver, it is hence possible to receive and send (exchange) USB input/output messages. A software application can then interpret them. A host device 21, 22 thus provides for remotely operating a peripheral device 31 connected to an access device 30, without the latter having the driver software module necessary for using resources of the peripheral device.

In a particular embodiment, the control device 20 is notably arranged to create, remove and manage virtual machines 21, 22 relying on physical machines. The physical machines are not represented in FIG. 1 for the sake of simplification. The control device 20 and the host devices 21, 22 are used to provide a software application rolled out in a cloud-computing system. Cloud-computing environments are available in three large service layers according to the type of resource made available. The "Infrastructure as a Service" (IaaS) layer aims to provide access to virtualized hardware resources (computation, storage, network) by relying on a set of physical hardware resources. The "Software as a Service" (SaaS) layer aims to expose software applications intended for end users. The "Platform as a Service" (PaaS) intermediate layer offers a set of tools and execution environments which provide for managing life-cycles of applications. One of the main benefits of virtualization is to enable the consolidation of hardware resources by pooling. This involves simultaneously implementing a set of virtualized hardware resources at a common physical hardware infrastructure (i.e. several virtual machines being executed on the same physical machine). Hereafter the description relates to the IaaS layer. By way of illustrative example, the virtualization technology is OpenStack with the Nova Compute module and the libvirt library.

More specifically, FIG. 1 illustrates an example implementation of the access technique in which the access device 30 is an access gateway, enabling devices of a local area network 3 to access the wide area network 1. The local area network 3 is also known by the terms private, enterprise or residential network.

The local area network can rely on various network technologies such as a wired Ethernet network according to the IEEE 802.3 standard, a Wi-Fi wireless network according to the IEEE 802.11 standard, or even a power line communication, PLC, network (for example HomePlug®, HD-PLC Alliance) according to the IEEE 1901 standard.

The devices of the local area network 3 can be any devices, for example household devices having a wired or wireless network connection. They can be for example a mobile phone or terminal, PLC sockets, or a TV decoder (set-top box), or a games console.

In the service area of the local area network, other devices are also present. They can be for example a smoke detector 32, household appliances (not represented), a presence sensor, etc. Only one home automation device is represented in FIG. 1. There is no limitation associated with the number of devices or sensors present in the local area network 3.

By way of illustrative example, the smoke detector 32 is arranged to communicate over a Zigbee radio access network. This radio access network is defined by the Zigbee Alliance. It is based at radio level on the IEEE 802.15.4 standard defined for wireless personal area networks (WPANs) and defines a high-level protocol enabling data exchange. There is no limitation associated with this radio technology. Other technologies can also be considered such as Bluetooth® Low Energy (BLE), Zwave, EnOcean, Sigfox, WMbus, etc.

Hereafter the description relates to the particular case in which the access gateway 30 does not support a Zigbee wireless interface. In this particular case, the peripheral device 31 which is connected to the access device 30 is an access dongle, arranged to communicate over a Zigbee radio access network. This access dongle 31 also comprises a USB serial connector. The dongle is known by the term "USB dongle". A host device 21, 22 is thus used to remotely operate the access dongle 31 connected to the access gateway 30, without the latter having the driver software module needed to use the resources of the access dongle. This manner of operation in particular enables one of the host devices 21, 22 to exchange data with the home automation device 32 via the access dongle 31.

In a particular embodiment, the peripheral device 31 is connected to the home automation box, which is hence the access device. In other embodiments, the peripheral device 31 is connected to devices of the local area network 3. By way of illustration, for an enterprise network, a peripheral device 31 is connected to a router of the enterprise network, another peripheral device of the same type is connected to another router of this enterprise network and these two peripheral devices are remotely operated by the same host device.

Other devices, not represented in FIG. 1, can also be connected to the host devices 21, 22. These can be for example collection devices arranged to receive from home automation sensors physical measurements in order to analyze them to provide a service.

This can for example be an electricity consumption monitoring service, a monitoring service as part of a service for monitoring a living environment, or a home support service for an elderly person. These services are only given by way of illustration and there is no limitation associated with these examples. The host devices can also implement the service logic.

Figure 2:
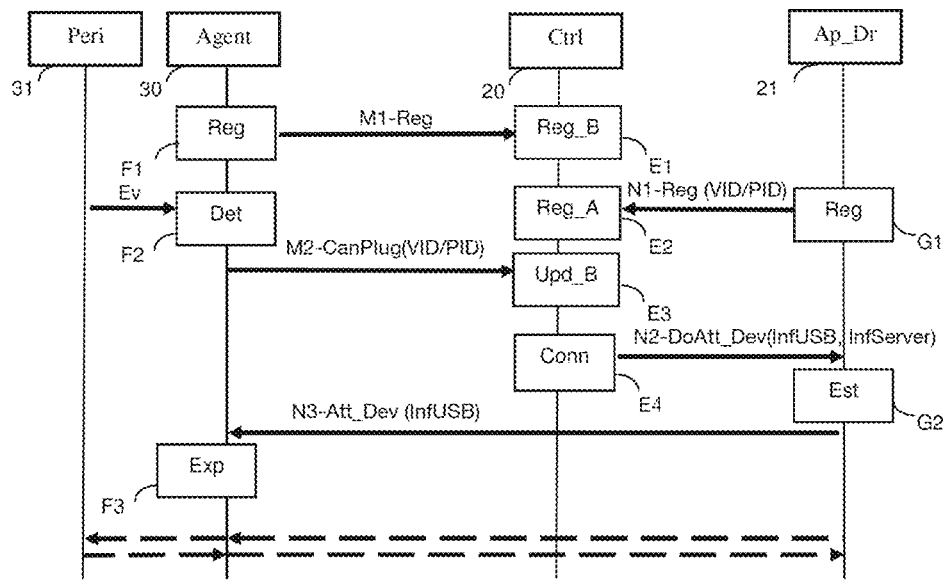
FIG. 2 illustrates exchanges to implement an access method in a system for hosting peripheral devices according to a particular embodiment.

There now follows a description of the technique for accessing a peripheral device in a particular embodiment with reference to FIG. 2.

At a step F1, the access device 30 registers with the control device 20 via a registration message M1. This registration message notably includes an address associated with the access device 30 and an IP port identifier. This address is a public address by which it is possible to reach the access device 30 from the wide area network. It is recalled here that the connected peripheral device does not have a public address by which it is possible to reach it from the wide area network. The IP port identifier enables communication with the encapsulation and extraction module (i.e. the generic agent).

This registration message M1 is received by the control device 20 at a step E1. The control device 20 registers the information associated with the access device 30 in a storage memory.

At a step G1, the host device 21 registers with the control device 20 via a registration message N1. This registration message N1 notably includes one or more vendor and product identifiers VIP/PID ("Vendor Identity/Product Identity").

This registration message N1 is received by the control device 20 at a step E2. This message N1 enables the control device 20 to identify which driver(s) the host device 21 has. The control device 20 registers the information associated with the host device 21 in a storage memory.

The execution of the next steps is triggered by the connection of the peripheral device 31 to the access device 30, indicated in the form of an arrow Ev in FIG. 2. In the particular example in which the peripheral device is an access dongle, once connected, the access dongle enables communication by means of a wireless interface with the device 32 of the local area network.

At a step F2, the access device 30 detects the physical connection of the peripheral device 31 to a USB port and sends to the control device 20 data M2 indicating that a peripheral device 31 is connected to it. This data M2 is for example a message and includes a vendor and product identifier (VID/PID) of the peripheral device 31 and a USB port identifier.

This data is received by the control device 20 at a step E3.

At a step E4, the control device 20 commands an association between the access device 30 and the host device 21 in the transport plane.

More specifically, the control device 20 sends to the host device 21 a command N2 to associate with the peripheral device 31 by means of the public address associated with the access device 30 and the IP port identifier. This association command N2 notably includes the USB port identifier.

This association command N2 is received by the host device 21 at a step G2. The execution of the association command triggers the sending, by the host device to the access device, of a command to outsource resources of the peripheral device. More specifically, the host device 21 commands the access device 30 to outsource the resources of the peripheral device 31 by a message N3 for commanding the outsourcing of resources of the peripheral device. This command N3 corresponds to an agreement for hosting the peripheral device 31 and notably includes the USB port identifier. This command N3 requests a USB/IP encapsulation/extraction module of the generic agent to export the peripheral device 31 by the execution of a local marking command to mark the device as exportable. The access device 30 can then play a role of USB server for the peripheral device 31 in relation to a USB client in the host device 21 in the data transport plane. Once this export has taken place, the control device 20 is informed of it by a message M3 and stores this information in association with the USB port identifier.

The host device 21 then plays a role of USB client for the peripheral device 31 via the access device 30 in the transport plane. USB request blocks (URBs) are sent by the host device 21 to the peripheral device 31 via the access device 30. These request blocks enable the host device 21 to transmit and receive data to and from the peripheral device 31 asynchronously. The peripheral device 31 is thus associated with the device driver installed in the host device 21. In the particular example embodiment in which the peripheral device is an access dongle, once the device 32 of the local area network is associated with the access dongle 31 via the wireless interface, this association enables the host device 21 to exchange data with the device 32 via the access dongle 31 by means of a wireless interface in a local area network by virtue of a driver for the access dongle installed in the host device 21.

It is observed that it is thus possible to transfer operation of the peripheral device into a host system located in the network. The access device 30 comprises a generic agent which can take charge of any peripheral device connected via a USB interface. This generic agent operates both on the control plane and on the data transport plane in order that a USB peripheral device can be connected to a service in the network. A virtual link is thus created between the USB peripheral device and a host device. The latter can also include an application module to implement a service. The modifications associated with taking charge of a new type of peripheral device are thus performed only in the network and do not require modifications to the access device 30. In the particular example embodiment in which a new wireless interface or a new radio technology is required in a home automation network, it is sufficient to connect to the access gateway (or home automation box) an access dongle specific to this technology. This connection does not lead to modifications at the access gateway or home automation box.

In the data transport plane, the encapsulation of USB frames in IP frames, at the lower layer, provides for operating the peripheral device connected via a USB interface. The device driver associated with a peripheral device is then rolled out in the network and no longer in the access device. In the particular example embodiment in which the peripheral device is a USB access dongle, it is then possible to transfer to and centralize in the network information transmitted by connected access dongles.

The method relies on a central service logic executed by the control device 20 in the control plane, enabling a service provider to directly operate a USB peripheral device. In the particular example embodiment in which the peripheral device is a USB access dongle, the service provider can then exploit associated sensor data located in a local home automation network.

In a particular embodiment, at step E4, the control device 20 selects a host device 21 suitable for hosting a type of peripheral device, identified by the vendor and product identifier VID/PID provided by the peripheral device 31 at step E3 in the data M2.

In the embodiment described, the access device 30 receives an implicit host agreement by the reception of a command N3 to outsource resources of the peripheral device 31.

In another particular embodiment, the control device 20 sends an explicit host agreement or a host rejection at step E3. The access device 30 can then store in lists identifiers of products suitable or unsuitable for being hosted by the host system. This means that the sending of data indicating that a peripheral device is connected, when it cannot be hosted, can be avoided.

In another particular embodiment, during registration of the access device 30 at step E1, the control device 20 transmits in response to the registration request a list of identifiers of products, or a list of classes of products, suitable for being hosted by the host system, referred to as a "whitelist". Thus, the access device 30 checks before sending the data M2 indicating that a peripheral device is connected to it whether the latter can be hosted based on the product identifiers, or product classes if necessary, stored in the whitelist. When this is not the case, the data M2 is not sent and the access method is terminated. It is emphasized here that it is also possible to send a list of identifiers of products, or a list of classes of products, which cannot be hosted by the host system, referred to as a "blacklist". In that case, the access device 30 checks before sending the data M2 indicating that a peripheral device is connected to it whether the latter can be hosted based on the product identifiers, or product classes if necessary, stored in the blacklist. This means that the sending of data indicating that a peripheral device is connected, when it cannot be hosted, can also be avoided.

Figure 3:
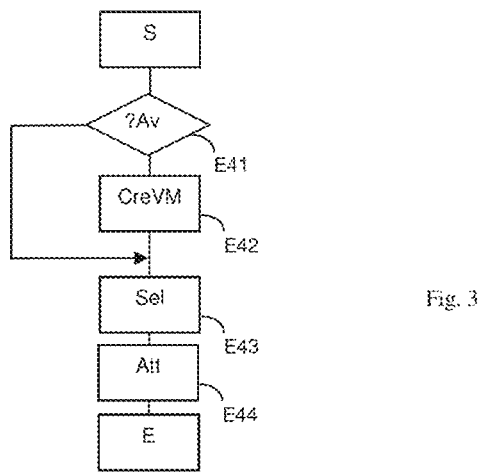
FIG. 3 illustrates one of the steps of the access method in a particular embodiment.

FIG. 3 illustrates step E4 for controlling an association between an access device 30 and a host device 21 in the data transport plane in a particular embodiment.

In this particular embodiment, the host system is a cloud-computing system. The host devices 21 are notably virtualized machines of the cloud-computing system.

At a substep E41, the control device 20 checks whether at least one host device 21 has sufficient capacities to host the access dongle 31.

When there is at least one host device, the method implements a host device selection substep E43, described later.

When there is no device having sufficient capacities to host the peripheral device 31, at a substep E42, the control device 20 creates or requests the creation of a virtual machine forming a new host device.

At selection substep E43, the control device 20 selects one of the host devices identified at substep E41 or the new host device newly created at substep E42.

At substep E44, the control device 20 commands the selected host device to associate with the peripheral device 31, as described previously with reference to FIG. 2.

In a particular embodiment, the control device 20 monitors the hosting capacities for a type of peripheral device. More specifically, it checks whether the available hosting capacities for peripheral devices of identical product identifiers are lower than a threshold and, if necessary, creates a virtual machine forming a new host device.

In a particular embodiment, the control device 20 receives a notification from the access device 31 when a peripheral device is disconnected. The control device can then remove a virtual machine when it is no longer hosting peripheral devices.

It is observed that in this embodiment, associated with an implementation in a virtualized environment, it is possible to dynamically adapt the host system in order that it can take charge of new peripheral devices according to demand. The host system also adapts to connection requests from new products, by creating upon demand host devices suitable for hosting them.

The control device 20 can dynamically adapt the resources to enable direct operation of the peripheral device by a host device. This dynamic adaptation of resources takes place according to certain technical criteria such as the product identifiers but also according to the availability of resources. Thus, if there is an insufficient number of certain resources for a type of peripheral device, with respect to a growing stock, the control device will be able to create new resources. However, if peripheral devices of the same type are taken out of service, the control device can reassign the unused resources.

It is emphasized here that these embodiments have been described in the context of a connection of the peripheral device via a USB type universal serial interface. These embodiments are easily transposable to other types of wired links such as FireWire, i.LINK, Thunderbolt, etc.

Figure 4:
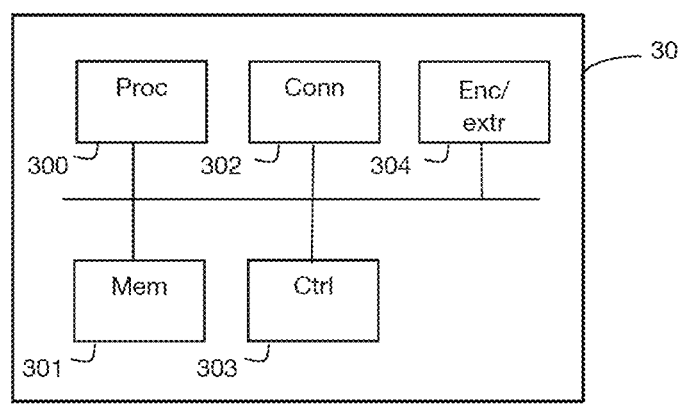
FIG. 4 represents an access device according to a particular embodiment.

There now follows a description of an access device 30 in a particular embodiment with reference to FIG. 4. The access device 30 has access to a wide area network and notably comprises:
- a memory area 301, arranged to memorize an application which contains code instructions to implement the steps of the access method, as described previously;
- a storage memory, not represented, arranged to store data used during the implementation of the access method, as described previously;
- a processor 300 to execute code instructions of software modules;
- at least one connector 302, arranged to receive at least one peripheral device via a serial interface;
- a software module 303, arranged to send to a control device 20 data M2 indicating that a peripheral device 31 is connected by means of the connector, to receive from a host device a command N3 to outsource resources of the peripheral device, and to associate this host device with the peripheral device, said association enabling remote access by said host device to operate the peripheral device by means of a driver for the peripheral device installed on said host device;
- an encapsulation and extraction module 304, arranged to encapsulate or extract USB frames in IP frames.

The software module 304 is also previously referred to as "generic agent".

It is emphasized here that the access device 30 also comprises other processing modules which are not represented in FIG. 4 and which are arranged to implement the various access device functions.

Figure 5:
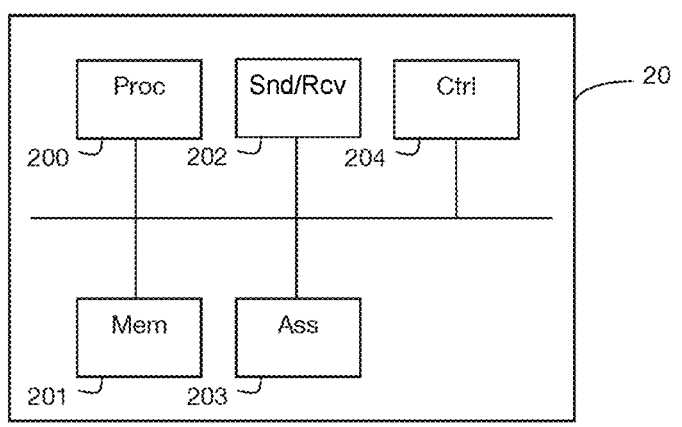
FIG. 5 represents a control device according to a particular embodiment.

The control device 20, as represented in FIG. 5, notably comprises in a particular embodiment:
- a memory area 201, arranged to memorize an application which contains code instructions to implement the steps of the access method, as described previously;
- a storage memory, not represented, arranged to store data used during the implementation of the access method, as described previously;
- a processor 200 to execute code instructions of software modules;
- an interface module 202, arranged to send and receive data;
- an association command module 203, arranged to send to a host device 21 a command N2 to associate with said peripheral device by means of the address of the access device, the execution of the association command triggering the sending, by the host device to the access device, of a command to outsource resources of the peripheral device and said association enabling remote access by said host device via the access device to operate the peripheral device by means of a driver for the peripheral device installed on said host device;
- a module 204 for controlling one or more host devices 21, 22.

The interface module 202 is notably arranged to receive data M2 indicating that a peripheral device 31 is connected to an access device 30 enabling access to the wide area network.

In a particular embodiment, the control module 204 is additionally arranged to manage virtualized resources, notably to create or remove at least one virtual machine forming a host device.

It is emphasized here that the control device 20 also comprises other processing modules which are not represented in FIG. 5 and which are arranged to implement the various functions of this device.

Figure 6:
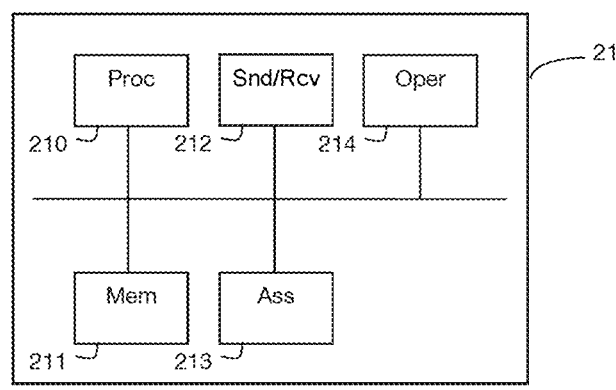
FIG. 6 represents a host device according to a particular embodiment.

The host device 21, as represented in FIG. 6, notably comprises in a particular embodiment:
- a memory area 211, arranged to memorize an application which contains code instructions to implement the steps of the access method, as described previously;
- a storage memory, not represented, arranged to store data used during the implementation of the access method, as described previously;
- a processor 210 to execute code instructions of software modules;
- an interface module 212, arranged to send and receive data;
- an association module 213, arranged to receive a command N2 to associate with a peripheral device by means of the address of an access device and, during the execution of the association command, to send to the access device a command N3 to outsource resources of the peripheral device;
- an operating module 204, arranged to remotely operate a peripheral device by means of a driver for the peripheral device installed on said host device.

It is emphasized here that the host device 21 also comprises other processing modules which are not represented in FIG. 6 and which are arranged to implement the various functions of this device.

The access technique is implemented by means of software and/or hardware components. In this regard, the term "module" can be in this document a software component or a hardware component, or an assembly of hardware and/or software components, suitable for implementing a function or a set of functions, according to that which is described previously for the module concerned.

A software component corresponds to one or more computer programs, one or more sub-programs of a program, or more generally to any element of a program or software item. Such a software component is stored in memory, and then loaded and executed by a data processor of a physical entity, and is likely to access the hardware resources of this physical entity (memories, recording media, communication buses, electronic input/output boards, user interfaces, etc).

In the same way, a hardware component corresponds to any element of a hardware assembly. This can be a hardware component that may or may not be programmable, with or without an integrated processor for executing software. This is for example an integrated circuit, a chip card, an electronic board for executing firmware, etc.

In a particular embodiment, the modules 303, 304 are arranged to implement the previously described access method. These are preferably software modules containing software instructions to enable those of the steps of the previously described access method, which are implemented by an access device, to be executed. The invention therefore also concerns:

a program for an access device, comprising program code instructions intended to command the execution of the steps of the previously described access method, when said program is executed by this device;

a recording medium that can be read by an access device on which the program for a device is recorded.

In a particular embodiment, the modules 203, 204 are arranged to implement the previously described access method. These are preferably software modules containing software instructions to enable those of the steps of the previously described access method, which are implemented by a control device, to be executed. The invention therefore also concerns:

a program for a control device, comprising program code instructions intended to command the execution of the steps of the previously described access method, when said program is executed by said device;

a recording medium that can be read by a control device on which the program for a device is recorded.

In a particular embodiment, the modules 213, 214 are arranged to implement the previously described access method. These are preferably software modules containing software instructions to enable those of the steps of the previously described access method, which are implemented by a host device, to be executed. The invention therefore also concerns:

a program for a host device, comprising program code instructions intended to command the execution of the steps of the previously described access method, when said program is executed by said device;

a recording medium that can be read by a host device on which the program for a device is recorded.

The software modules can be stored in or transmitted by a data medium. This can be a hardware storage medium, for example a CD-ROM, a magnetic floppy disk or a hard disk, or a transmission medium such as an electrical, optical or radio signal, or a telecommunication network.

It goes without saying that the embodiments which have been described previously have been given purely by way of indication and are not at all limiting, and that a number of modifications can easily be brought about by a person skilled in the art without thereby departing from the scope of the invention.

The invention claimed is:

1. A method of access via a wide area network to a peripheral device, said method comprising:
    receiving, by a control device, data indicating that the peripheral device is connected via a serial interface to an access device having access to the wide area network; and
    sending, by the control device to a host device, an association command to associate with said peripheral device by using an address associated with the access device, execution of the association command triggering a sending, by the host device to the access device, of a command to outsource resources of the peripheral device and said association enabling remote access by said host device via the access device to operate the peripheral device by using a driver for the peripheral device installed on the host device.

2. The access method as claimed in claim 1, additionally comprising selecting said host device by the control device according to a product identifier of the peripheral device.

3. The access method as claimed in claim 2, additionally comprising creating a virtual machine forming a new host device, when no host device has capacities required to host the peripheral device.

4. The access method as claimed in claim 2, additionally comprising creating a virtual machine forming a new host device, when the hosting capacities available for peripheral devices having identical product identifiers are lower than a threshold.

5. The access method as claimed in claim 1, comprising sending, to the access device, at least one identifier of a product unable to be hosted.

6. A method of access via a wide area network to a peripheral device, said method comprising:
    sending, by an access device having access to the wide area network to a control device, data indicating that the peripheral device is connected via a serial interface to said access device;
    receiving, by the access device, a command, from a host device, to outsource resources of the peripheral device; and
    associating the host device with the peripheral device via the access device, said associating enabling remote access by said host device via the access device to operate the peripheral device by using a driver for the peripheral device installed on said host device.

7. A control device for access via a wide area network to a peripheral device, said device comprising:
    a processor; and
    a non-transitory computer-readable medium comprising instructions stored thereon, which when executed by the processor configure the control device to perform acts comprising:
    receiving data indicating that the peripheral device is connected via a serial interface to an access device having access to the wide area network; and
    sending to a host device an association command to associate with said peripheral device by using an address associated with the access device, execution of the association command triggering a sending, by the host device to the access device, of a command to outsource resources of the peripheral device and said associating enabling remote access by said host device via the access device to operate the peripheral device by using a driver for the peripheral device installed on said host device.

8. The control device as claimed in claim 7, wherein the instructions further configure the control device to manage virtualized resources, by creating or removing at least one virtual machine forming a host device.

9. A host device, comprising:
    a processor; and
    a non-transitory computer-readable medium comprising instructions stored thereon, which when executed by the processor configure the host device to perform acts comprising:
    remotely operating a peripheral device via a wide area network by using a driver for the peripheral device installed on said host device;
    receiving from a control device an association command to associate with the peripheral device by using an address of an access device to which the peripheral device is connected via a serial interface and, during execution of the association command, sending to the access device a command to outsource resources of the peripheral device.

10. An access device for accessing a wide area network, comprising:
    at least one connector, arranged to receive at least one peripheral device via a serial interface;
    a processor; and a non-transitory computer-readable medium comprising instructions stored thereon, which when executed by the processor configure the access device to perform acts comprising:

sending to a control device data indicating that the peripheral device is connected by means of the connector, receiving from a host device a command to outsource resources of the peripheral device, and associating said host device with said peripheral device, said association enabling remote access by the host device to operate the peripheral device by using a driver for the peripheral device installed on said host device.

* * * * *